Figure 1:
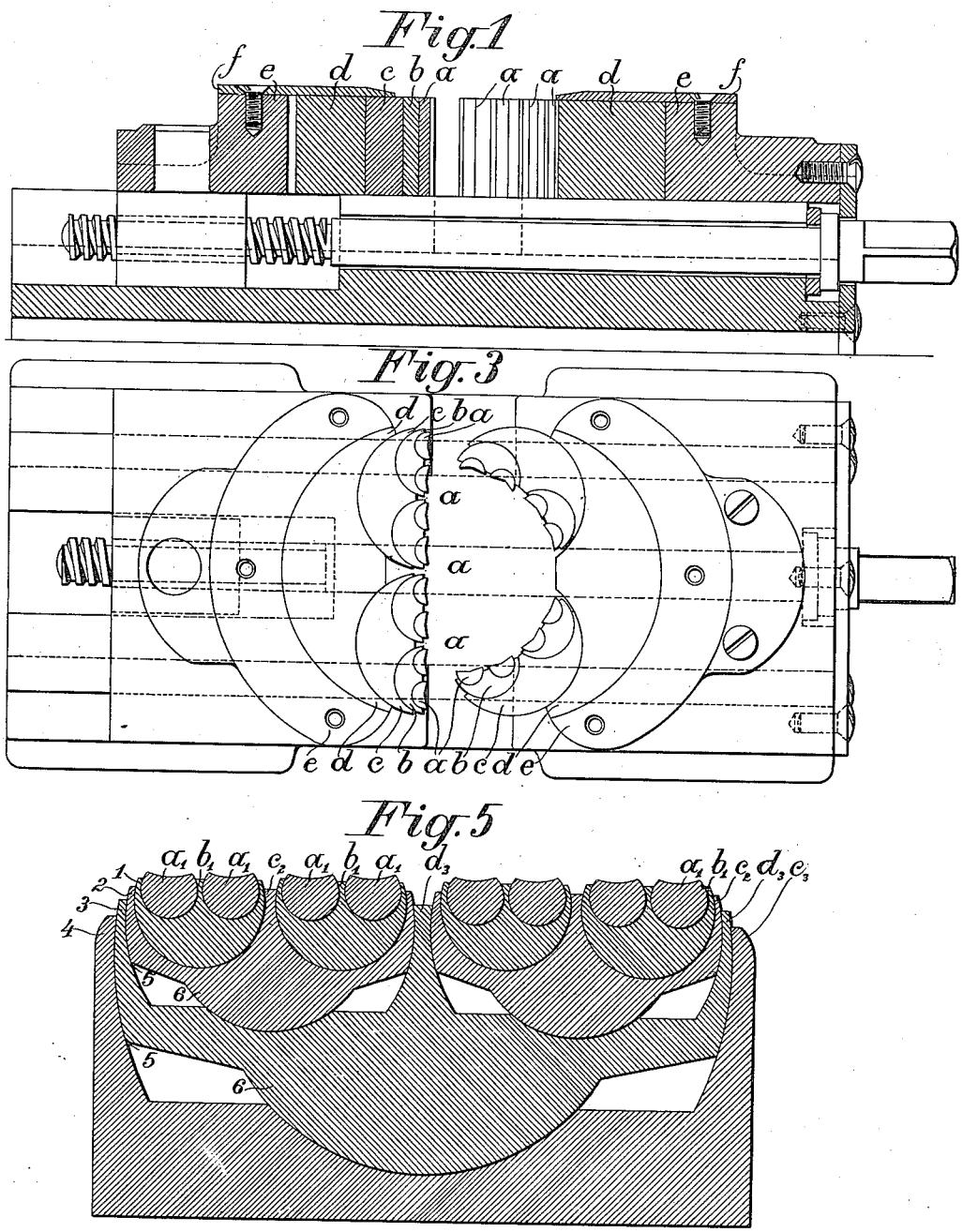

P. K. KUNZE.
DEVICE FOR OBTAINING INTIMATE CONTACT WITH, ENGAGING, OR CLAMPING BODIES OF ANY SHAPE.
APPLICATION FILED MAR. 21, 1912.

1,059,545.

Patented Apr. 22, 1913.

5 SHEETS—SHEET 2.

Witnesses:
B. Dommers
E. Eckert

Inventor,
Paulin Karl Kunze
By Henry....
Atty.

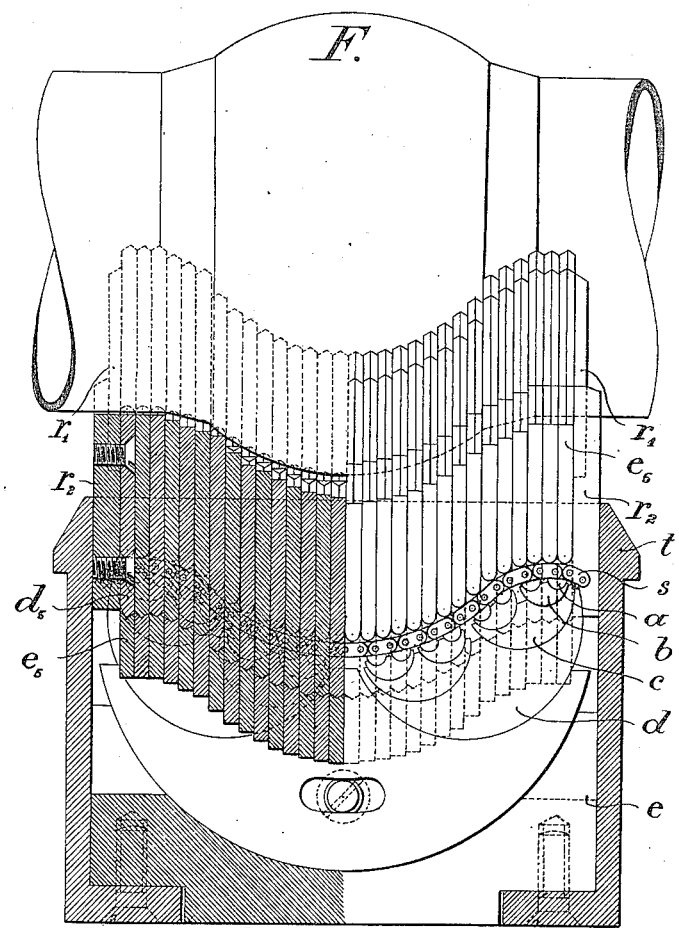
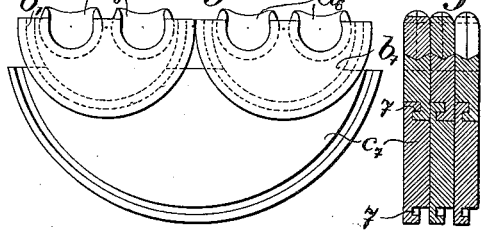

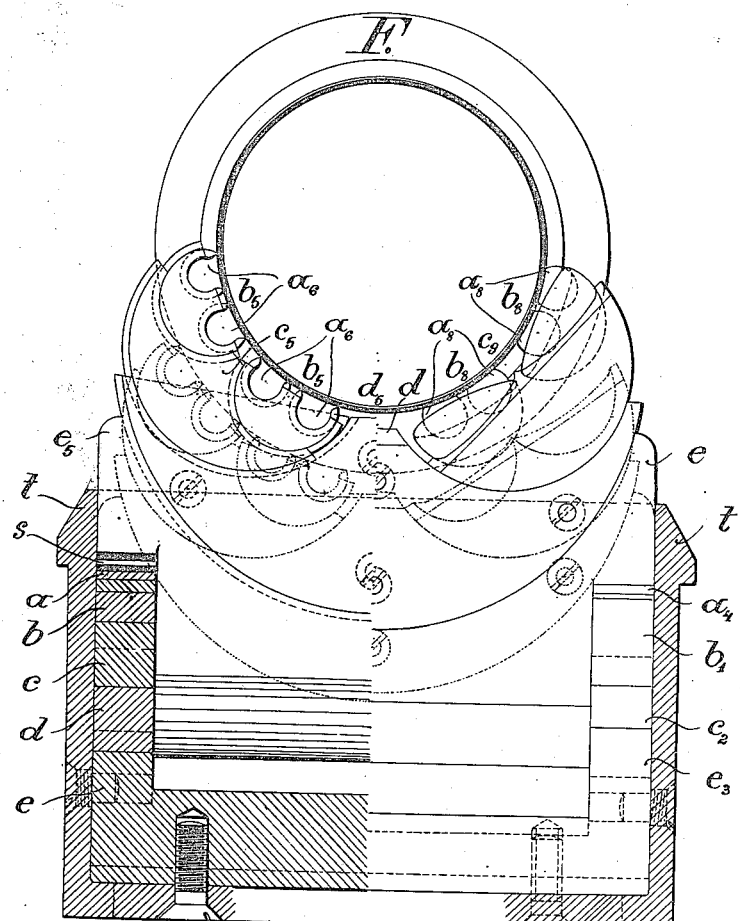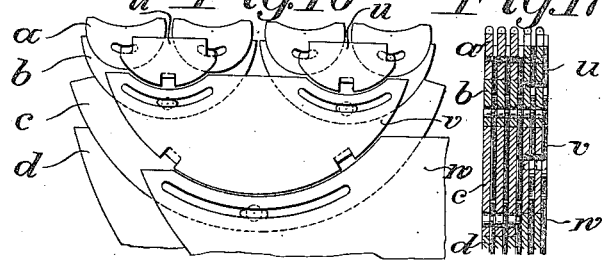

P. K. KUNZE.
DEVICE FOR OBTAINING INTIMATE CONTACT WITH, ENGAGING, OR CLAMPING BODIES OF ANY SHAPE.
APPLICATION FILED MAR. 21, 1912.

1,059,545.

Patented Apr. 22, 1913.

5 SHEETS—SHEET 5.

Witnesses:
B. Dommers
E. Leckert

Inventor:
Paulin Karl Kunze.
By Henry Orth Jr.
Atty.

UNITED STATES PATENT OFFICE.

PAULIN KARL KUNZE, OF VIENNA, AUSTRIA-HUNGARY.

DEVICE FOR OBTAINING INTIMATE CONTACT WITH, ENGAGING, OR CLAMPING BODIES OF ANY SHAPE.

1,059,545.      Specification of Letters Patent.      Patented Apr. 22, 1913.

Application filed March 21, 1912. Serial No. 685,288.

*To all whom it may concern:*

Be it known that I, PAULIN KARL KUNZE, subject of the Emperor of Austria-Hungary, residing at Vienna, Austria-Hungary, have invented certain new and useful Improvements in Devices for Obtaining Intimate Contact With, Engaging, or Clamping Bodies of Any Shape, of which the following is a specification.

The device forming the object of the present invention purposes to effect by means of rotatable and oscillatable cheeks, an intimate contact, engagement with or clamping of bodies of any shape, the contact being effected at as many points as possible, whereby owing to the reactions or the automatic adjustment to the position of equilibrium of all the cheeks, if the latter are symmetrically arranged, the pressure is uniformly distributed over all points of contact, while if the arrangement is unsymmetrical there is a greater pressure to one side.

According to the present invention the cheeks consist of parallel cylindrical segments, which can rotate about their geometrical axes, and which are placed with their cylindrical surfaces in pairs side by side in seatings in large cylindrical segments and are arranged symmetrically to the vertical middle plane of the latter. Every pair of such larger segments can be arranged in this manner in a still larger segment and so on, the number of these segmental shells depending on the intimacy of contact required. In the initial position all these cheeks are in such a position that their axes lie in a plane at right angles to the plane of symmetry of the largest segment, which results in a uniform distribution of the pressure at all points of contact. The cylindrical segments may also consist of thin plates arranged at right angles to their axis, and groups of such plates, which make contact with the surface of the body in one direction, e. g. in the direction of the principal axes of the body, can be supported or operated by special sets of cheeks, which in such case are also formed of groups of plates and the adaptability of which acts in the direction of the generating lines of the body.

Instead of cylindrical segments, spheres or spherical segments may be placed in corresponding seatings in their respective larger cylindrical segments, or the whole may consist of spherical segments only.

Such devices as described above may be used in multiple modifications for many varied purposes, for example clamping frames, (vises, lathe chucks) holding devices (limb and head clamps, foot clamps for surgical and similar instruments), for supporting devices and supports (lunette bearings, supports, chair seats and backs, operating chairs and invalid chairs), for matrices, self adjusting formers, grinding and polishing devices, brake blocks, sheet metal straightening machines, bending matrices and stamps, contact devices for heavy currents and the like.

Several constructions of the cheeks, bearings for the same and of devices to which the invention is applicable are shown by way of example in the accompanying drawings.

Figure 2:
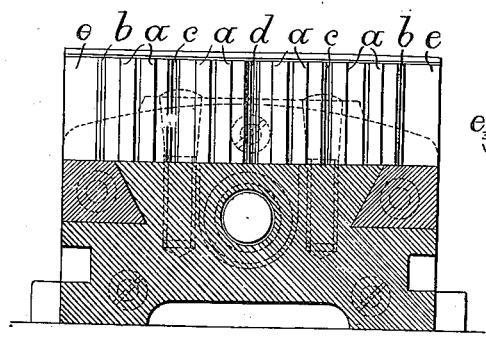

Figures 1, 2, and 3 show in longitudinal and cross section and plan respectively a parallel vise provided with the device comprising the present invention.

The device consists in a set of cheeks, the engaging surfaces of which are formed by parallel cylindrical segments *a* which can rotate about their geometrical axes and which are arranged with their cylindrical surfaces in pairs side by side in two seatings in similar but larger cylindrical segments *b* and these seatings are symmetrical to the vertical middle plane of these latter segments. The cylindrical segments *b* are similarly arranged in pairs in the segments *c* and these again in a common segment *d* which bears with its cylindrical surface against the seating of a cheek *e* which may be the fixed or movable jaw of the vise or have any other suitable form.

In the initial position of the set of cheeks, in which the primary segments *a* are situated in a straight line (see left hand side of Fig. 3), the centers of the axes of all the similar segmental surfaces *a*, *b*, *c*, *d* lie in a straight line which is given by the diameter of the largest segment *d*, which is at right angles to the axes of symmetry of the whole set.

The contact surfaces of the cheeks, the number of which can be increased or decreased as desired, may be either plane, or as shown in the drawing, concave; the engaging parts may also be formed as sharp edges, rollers or spheres.

The separate cylindrical segments can be prevented from being displaced from their seatings in various manners, which will be more fully described later. They may also be made of steel and magnetized, so that they adhere sufficiently to each other, in order to be carried along when the vise is opened.

To prevent the vise-jaws from being lifted the sets of cheeks, in the arrangement shown in Figs. 1–3, are each secured by a cover plate $f$ screwed on to each jaw $e$; for the same purpose, the cylindrical segments may be provided on their cylindrical part of their periphery with concentric projecting guides which engage in grooves in the seatings. The working cheeks $a$ may also be arranged unsymmetrically on each side of the axis of the cylindrical segment $b$, also the segments $b$ may be unsymmetrical in the segments $c$ and so on, which gives rise to an unequal distribution of the pressure on the separate working cheeks $a$ and an increase in the lateral displacement of the various cheek segments or of the whole set of cheeks can be obtained. This arrangement enables objects to be gripped which can only stand a very slight pressure at certain parts, so that the pressure at these points does not exceed a predetermined limit, or on the other hand by exerting greater pressure at various points of an object the desired deformation of the same can be obtained.

The sets of cheeks may—if after removing the clamped object it is desired that they return to their initial position—if necessary be operated by suitably arranged springs, or the separate segments can in special cases, if made of non-magnetic material, be provided with built-in steel magnets, or, in large constructions, with electromagnets.

Figure 4:
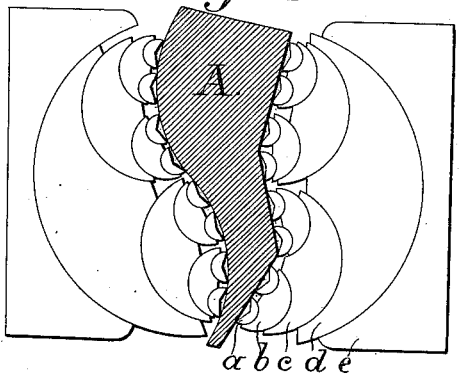

After inserting any shaped body between the open jaws of the vise, on closing the same, the various segments rotating partially around their axes and partially with their axes around the axes of the next larger segments, adjust themselves in a position of equilibrium determined by the profile of the object held until they are all subjected to an equal resistance at all parts of the gripped surface. In Fig. 4 a very irregular body A is shown with the cheeks adjusted against its curved and plane surfaces.

The uniform distribution of the contact pressure over as large an area as possible of the surface and at as many points of contact as possible insures on the one hand the gripped object against undue local stress and damage to its surface and from deformation of its profile even if the applied pressure is very great; on the other hand this uniform distribution of pressure enables the object to be firmly held in the desired position even with only a small applied pressure.

The cheeks themselves tend to fit exactly to the surface of the object, so that they are suitable both to clamp and also to support any shaped bodies.

Figure 6:
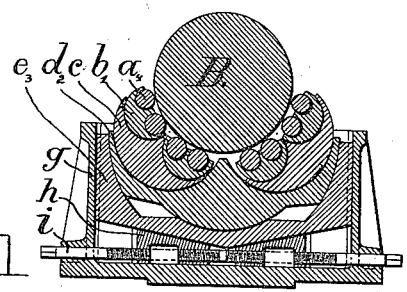

In order to return the cheeks to their initial position after removing the object, they can be operated by springs or with magnets. Fig. 6 shows in section a modified construction of the disposition of the cheeks. The cheeks $a^1$ are securely held in the cheeks $b^1$ and these in the cheeks $c^2$ and so on by making the walls of the respective seatings surround the cylindrical segments by more than half their circumference, so that the edges 1, 2, 3 ..... serve as retaining parts. Each cheek profile, $c^2$, $d^3$, also shows a modified form in so far that the cylindrical surface is stepped down at 5, 6, to a smaller radius of curvature. If such a segment has to receive similarly stepped down segments, its seatings also receive a stepped down cross section. This construction is especially suitable for large sets of cheeks in which the height of the construction is limited and saving in weight and easy movement of the cheeks are required. The surface pressure is in this case chiefly transmitted by the reduced cylindrical surface to the center of the seating, while the side walls of the latter serve only as guides. Since such cheeks have a very small frictional moment opposed to their rotation they move much more easily.

Fig. 6 shows as a further example of the application of the present invention a lathe chuck for heavy turnings B, and the like, wherein the working cheeks are replaced by rollers or the like $a^4$ which are held by the segments $b^1$ which in their turn rest in the segments $c$. The latter are journaled in a cheek $d^2$ which has a stepped down cylindrical surface and this latter is carried by the lower supporting segment $e^3$ in a guide casing $g$ and is also adjusted vertically by means of the screw spindle $i$ and lifting wedges $h$.

Figure 7:
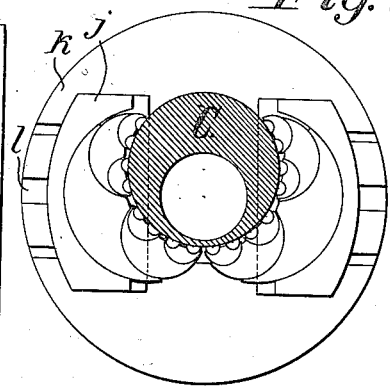

Fig. 7 shows a lathe chuck having for example two jaws $j$ each of which has a set of cheeks for holding an eccentric disk C, these jaws being guided in the disk $k$ and moved by a screw lying in the middle slot $l$.

Figures 8, 9:
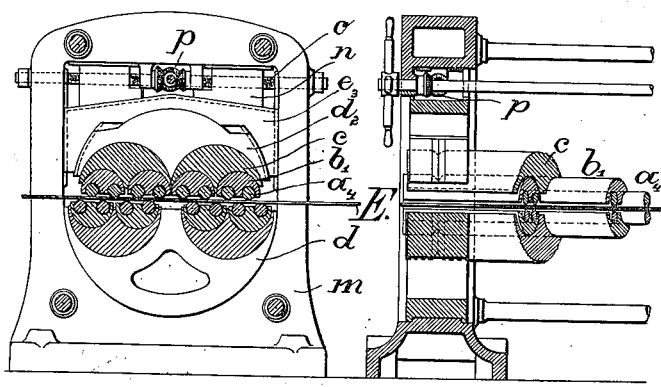

Figs. 8 and 9 show the application of the device to a sheet metal stretching or straightening machine, the rolls of which can receive very small diameters and must therefore be arranged very close together. The rolls $a^4$ form in this case the working cheeks of the two sets of cheeks consisting of the elements $b^1$, $c$, $d$ and $d^2$, which are arranged in a frame work m. The supporting segment $e^3$ fitting on the upper pressure cheek $d^2$ and guided in the frame work is adjusted by the adjusting gear $o$, $p$. The sets of cheeks can either extend a short distance beyond the frame work, (for small sheets) or they can extend transversely between two frames and serve as bearings for the rollers.

Figure 10:
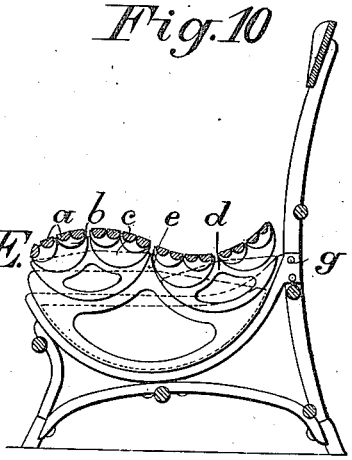

Fig. 10 shows a further application of the invention, namely a chair having an accommodating seat formed by laths $a$ which are cylindrical on their under side and each of which is journaled in a segmental element $b$, $c$, $d$, $e$, forming a set of cheeks as above described. Each set is journaled in a concave guide $q$. Between the larger members $d$, $e$, of the set, also between $e$ and $q$ balls or rollers can be inserted. The back of the chair may also be constructed in a similar manner, and for lounge or reclining chairs, both the back and the seat may have a common guide segment, so that the back can be brought into the horizontal position. In this manner the various members of the seat fitting close to the body make stuffing unnecessary, since the body is supported at numerous points and in any position is not uncomfortably affected by local pressures.

In the above described arrangements the cheeks fit closely and completely only in one direction of the surfaces in contact, that is in the direction of their principal axis. In this case the generating line of the contact surface may be either a straight line, a curve or the combination of both if the contact cheeks conform to the generating line along their whole length.

Figure 13:
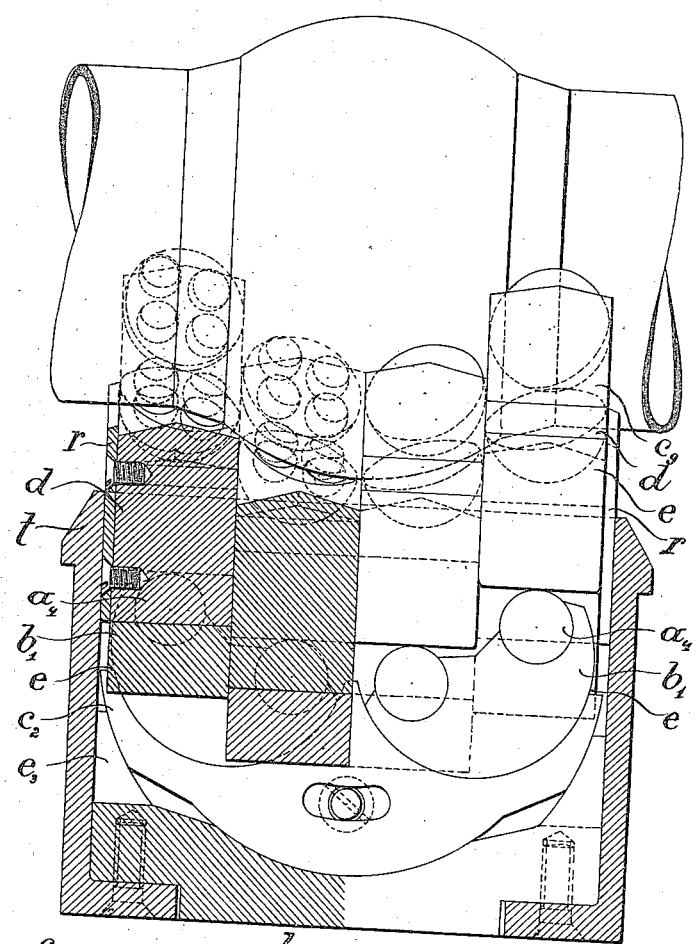

By a combination of the automatic cheek sets a complete contact is obtained both in the direction of the principal axis and generating lines, which distributes the pressure to a larger number of points, which for example, may be necessary when clamping or supporting limbs. Such combinations have on the one hand sets of cheeks, each of which is split up into a number of sets of thin plates which engage the surface of the body in one direction, namely in the direction of the principal axis and further sets of cheeks of a similar kind which engage in the direction of the generating lines and support or actuate the first set of cheeks. Examples of this combination are shown in Figs. 11-13, Fig. 11 showing in longitudinal section and side elevation, and the left half of Fig. 12 in vertical cross section, one construction, Fig. 13 a longitudinal section and side elevation, and the right half of Fig. 12 an end elevation of a second construction.

The similar sets of cheeks formed of thin plates disposed in series make contact with the body F, each set comprising the cheeks $a^6$, $b^5$, $c^5$, $d^5$, and $e^5$ preferably having V shaped guiding surfaces. The working cheeks $a^6$ (Figs. 14 and 15) are rounded off at their working surfaces and have two points of contact. The set of thin plates is incased between two movable cover plates $r^1$ each of which is partially covered by a segmental covering plate $r^2$ fixed to the outermost plate and is guided in arc shaped recesses in the same. The lowest supporting segment $e^5$ has vertical sides and stepped down parts at right angles thereto, and by means of a chain $s$ or a band bears against the cheeks $a$ of lower sets comprising cheeks $a$, $b$, $c$, the contact plane of which is at right angles to that of the upper set of plates. The plate (or plates) $e$ which supports the lower sets of cheeks is fixed in a casing $t$, which serves as a bearing for the whole set.

The lateral pressure exerted transversely to the plane of contact of the cheeks is taken partially by the profiled guiding surfaces of the segments, partially by the cover plates $r^1$, $r^2$, and is transmitted to the casing $t$. The sets of plates can be arranged in groups at a mean inclination corresponding to the curvature of the surface of the object in order to reduce or equalize the lateral pressure and to prevent the sets from deviating from the positions at right angles to the corresponding part of the surface. The casing then has suitably inwardly inclined side walls and wedge shaped guides in the acute angled space between two groups.

If the surfaces to be supported or clamped are concave then the walls of the casing and the surfaces of the guides have the opposite inclination.

In the construction shown in Figs. 13 and 12 (right half) the separate sets of cheeks are of greater thickness and the working cheeks consist of spherical segments $a^8$ which have three claw like points on their engaging surface (Figs. 18 and 19) and are journaled in fours in a larger spherical segment $b^8$. Each pair of segments $b^8$ is journaled in a cylindrical segment $c^9$ and pairs of these latter in cylindrical segments $d$ while these are journaled in a seating $e$. The segmental covering plates $r$ serve to take the lateral pressure.

The cheeks $e$ bear with the flat surface of their stepped down parts of decreased diameter against a set of cheeks at right angles thereto, which consists in the cylindrical cheek $a^4$ the cylindrical segments $b^1$ and $c^2$ and journaled together with the piece $e^3$, in the casing $t$.

A combination of cylindrical segments with spherical segments can also be used, with other cheek members; if necessary a set of cheecks can consist throughout of spherical segments. Also these spherical segments with stepped down peripheries, as with the cylindrical segments, may be used.

In Figs. 14–20 a few examples of devices for preventing the removal of flat or spherical cheeks from their seatings are shown.

In Figs. 14 and 15 this is attained by inclosing the cheeks $a^6$ for more than half their circumference in their seatings, which prevents a lateral displacement, while with the cheeks $b^7$, $c^7$ the shape of the seatings prevents them both from falling out and from lateral displacement. In Figs. 16 and 17 this is effected by pieces $u$, $v$, $w$ which are inserted between the sets of thin plates and connected with the latter by pins and slots. These inserted pieces may be segmental or simply clamps made of sheet iron or wire.

Figure 18:
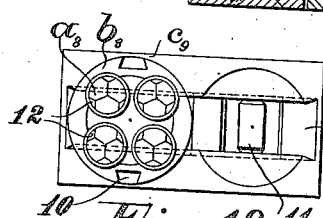
Figure 19:
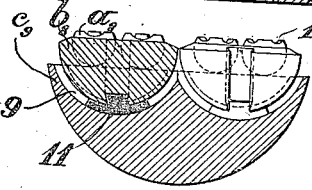
Figure 20:

According to Figs. 18, 19, 20 the cheeks $a^8$ provided with the claws 12 are held by the spherical segments $b^8$ which surround them and act as their seatings. The latter can, in certain cases, be secured from rotating in the segments $c^9$ in a horizontal direction for which purpose a dovetail groove 9 is provided in the segment $c^9$ concentric to its curvature, and a groove 10 is provided in the spherical segment $b^8$. The groove 9 forms a guide for the guide bar 11 which is provided with two intersecting guide surfaces, so that on the one hand a relative rotation of the segments $b^8$ in their supports $c^9$ can only occur in the direction given by the guide 11 and on the other hand owing to the dovetail shape of the guides the spherical segments $b^8$ are prevented from coming out of their seatings.

I claim as my invention—

1. In a self-conforming bearing, a support a plurality of superposed series of conforming elements in freely movable operative relation to the support, each series decreasing in the number of elements from the surface to be engaged to the support.

2. In a self-conforming bearing, a support, a number of superposed series of conforming elements in freely movable operative relation to the support, each series decreasing in number and size from the surface to be engaged to the support, and when in normal position the centers of the several series lying in parallel planes.

3. In a self-conforming bearing, a support, a number of superposed series of conforming elements in freely movable operative relation to the support, each series decreasing in number of elements from the surface to be engaged to the support, a plurality of elements of one series being in unsymmetrical engagement with an element of the next smaller series.

4. In a self-conforming bearing, a support, a number of superposed series of elements in freely movable operative relation to the support, each series decreasing in number of elements from the surface to be engaged to the support, and when in normal position having the centers of their elements in parallel planes perpendicular to the axis of the support, a plurality of elements of one series being in unsymmetrical engagement with an element of the next smaller series.

5. In a self-conforming bearing, a support, a number of superposed series of elements having cylindrical surfaces and in freely movable operative relation to said support, each series of elements decreasing in number and the elements of the series increasing in size from the surface to be engaged to said support.

6. In a self-conforming bearing, a support, a number of superposed series of elements having cylindrical surfaces and in freely movable operative relation to said support, each series of elements decreasing in number and the elements of the series increasing in size from the surface to be engaged to said support, and the axes of the cylindrical surfaces of the elements of the several series lying in parallel planes when in normal position.

7. In a self-conforming bearing, a support, a number of superposed series of conforming elements in freely movable operative relation to the support and divided into two groups at an angle to one another, the number of elements of the several series of one group decreasing from the surface to be engaged to the second group and number of elements of several series of the second group decreasing from the first group supported thereby to the support.

8. In a self-conforming bearing, a support, a number of superposed series of conforming elements in freely movable operative relation to the support and divided into two groups at an angle to one another, the number of elements of the several series of one group decreasing from the surface to be engaged to the second group and the number of elements of several series of the second group decreasing from the first group supported thereby to the support and a flexible element interposed between the two groups of series.

9. In a self-conforming bearing, a support, a number of superposed series of conforming elements in freely movable operative relation to the support and divided into two groups at an angle to one another, the number of elements of the several series of one group decreasing from the surface to be engaged to the second group and the number of elements of several series of the second group decreasing from the first group supported thereby to the support, the centers of the elements of the several series when in normal position lying in parallel planes.

10. In a self-conforming bearing, a support, a number of superposed series of freely movable conforming members having cylindrical engaging surfaces and divided into two groups at right angles to one another, the number of members of the series of one group decreasing from the surface of an object to be engaged and increasing in size toward the other group and said other group similarly varying from the first group to the support.

11. In a self-conforming bearing, a support, a number of superposed series of freely movable conforming members having cylindrical engaging surfaces and divided into groups at right angles to one another, the number of members of the series of one group decreasing from the surface of an object to be engaged and increasing in size toward the other group, said other group similarly varying from the first group to the support, and the axes of the several cylindrical surfaces being mounted to be positioned in parallel planes.

12. In a self-conforming bearing, a support, a plurality of superposed series of freely movable conforming elements in operative relation to the support, each series decreasing in the number of elements from the surface to be engaged to the support, and means to interlock one series of members with the other.

13. In a self-conforming bearing, a support, a number of superposed series of freely movable elements having cylindrical surfaces and in operative relation to said support, each series of elements decreasing in number and the elements of the series increasing in size from the surface to be engaged to said support, and means to interlock one series of elements with the next adjacent series and constrain their rotation in a plane.

14. In a self-conforming bearing, a support, and groups of superposed series of freely movable conforming elements, the ends of the last series of members of one group being supported at each end by a similar group of superposed series of conforming elements.

15. In a self-conforming bearing, a support, a plurality of superposed series of freely movable conforming elements decreasing in number from the outermost series toward the support, and increasing in size, the number of conforming elements in one series being double the number of elements in an adjacent series.

16. In a self-conforming bearing, a support, a plurality of superposed series of freely movable conforming elements in operative relation to one another and to the support, each series decreasing in number, and the size of the individual elements of the series increasing from the series having the greatest number of elements to the support, and the elements of some of the series having stepped surfaces forming projections on which they rock, said projections having a radius of curvature less than the radius of the element.

In testimony whereof I have hereunto set my hand in presence of two subscribing witnesses.

PAULIN KARL KUNZE.

Witnesses:
    JOSEF RUBASCH,
    AUGUST FUGGER.